United States Patent [19]

Yamaguchi et al.

[11] Patent Number: 5,882,704
[45] Date of Patent: *Mar. 16, 1999

[54] PROCESS FOR THE PRODUCTION OF CREAM CHEESE-LIKE PRODUCTS

[75] Inventors: Yukihiro Yamaguchi; Yoshiko Sakaue, both of Osaka-fu; Norio Sawamura, Wakayama-ken, all of Japan

[73] Assignee: Fuji oil Company Limited, Osaka-fu, Japan

[*] Notice: This patent issued on a continued prosecution application filed under 37 CFR 1.53(d), and is subject to the twenty year patent term provisions of 35 U.S.C. 154(a)(2).

[21] Appl. No.: 780,413

[22] Filed: Jan. 9, 1997

[51] Int. Cl.6 .......................................... A23C 9/12
[52] U.S. Cl. ................................ 426/36; 426/34; 426/38; 426/580; 426/582
[58] Field of Search .................................. 426/34, 36, 38, 426/580, 582, 39, 40, 42, 43, 583

[56] References Cited

U.S. PATENT DOCUMENTS

| | | | |
|---|---|---|---|
| 4,341,801 | 7/1982 | Weissman | 426/40 |
| 4,597,971 | 7/1986 | Davis | 426/30 |

*Primary Examiner*—Leslie Wong
*Attorney, Agent, or Firm*—Wenderoth, Lind & Ponack, L.L.P.

[57] ABSTRACT

A production process for cream cheese-like products by fermenting a cream mix comprising 2 to 15 wt. % of a protein component, 2 to 15 wt. % of a carbohydrate assimilable by lactic acid bacteria, 10 to 50 wt. % of a fat component, 40 to 75 wt. % of water and an emulsifier and characterized in that after pasteurization or sterilization, without substantial removal of the whey, the pasteurized or sterilized fermentation material is homogenized and cooled.

4 Claims, No Drawings

PROCESS FOR THE PRODUCTION OF CREAM CHEESE-LIKE PRODUCTS

FIELD OF THE INVENTION

The present invention relates to a process for the production of cream cheese-like products. More specifically, it relates to a process for producing soft, pasty cream cheese-like products (imitation cream cheese products) which have a good flavour and which can easily be kneaded into the dough of or used as a filling in confectionery and bread, which, when used as a spread, have a hardness which is not readily affected by ambient temperatures and thus show stable spreadability.

BACKGROUND OF THE INVENTION

Recently, imported natural cream cheese has been widely used as an ingredient for confectionery products. However, these natural products are in the form of a hard paste and as such they cannot easily be blended in with the other powder ingredients of cakes. Thus, a soft cream cheese with good workability is desired.

Furthermore, mayonnaise, which is an oil-in-water type emulsion or else margarine, which is a water-in-oil type emulsion, have been widely used as a spread to be used on bakery goods, but they both have a high oil content and thus in many cases, they cause migration of their fat phases into the bakery goods with a resulting deterioration in the texture and flavour. Also, since neither of them bind well to ingredients such as ham or cutlets, they tend to effect the separation of such products from the bread. In particular, the latter, margarine, has drawbacks in that its hardness tends to be affected by ambient temperatures and is lowered under high temperature conditions such as in summer, which results in stable spreadability being difficult to obtain. Also, although cream cheese and yogurt and the like are used as fermented milk products, the former, cream cheese is hard and difficult to spread and the latter, yogurt, is problematical in that it soaks into the bread.

Considering this situation, JP-A 62-289145 discloses a process for producing soft cheese products by adding rennet to a filled cream composed of an aqueous solution containing non-milk fat solids, oils and fats, and an emulsifier, then, after lactic acid fermentation and sterilization or pasteurization, the whey is separated off. Also, JP-A 62-83846 discloses a process for the production of cream cheese-like products by lowering the pH of a cream composed of rennet casein, water and oils and fats using an organic acid without conducting any lactic acid fermentation and then homogenizing. However, with the former products, not only does the yield decrease because of the removal of the whey, but also processing equipment for the eliminated whey becomes necessary. Because the latter is prepared using a composition of casein and oils and fats without employing any lactic acid fermentation, the resulting taste is quite different from that of cream cheese.

OBJECTS OF THE INVENTION

The main object of the present invention is to provide cream cheese-like products with a good flavor as well as moderate softness that is easily blended in with the other ingredients in confectionery products. In addition, the present invention provides a process for the production of cream cheese-like products that have improved squeezability suitable for use as a filling, not having as oily a feel as margarine or mayonnaise when used as a spread for bread and the like, exhibiting a moderate binding capacity with respect to other ingredients, having a hardness which is not readily affected by ambient temperatures, and stable spreadability as well as spreadability suitable for use as a spread with a long shelf-life.

SUMMARY OF THE INVENTION

As a result of the intensive study of the present inventors, it has been found that, to solve the above problems, the desired cream cheese-like products can be obtained by fermenting a cream mix having a specific composition with lactic acid bacteria and then sterilizing or pasteurizing it without separating off the whey.

Namely, the present invention provides a process for the production of lactic acid fermentation food products which comprises fermenting a cream mix comprising 2 to 15 wt. % protein, 2 to 15 wt. % carbohydrate assimilable by lactic acid bacteria, 10 to 50 wt. % fat, 40 to 75 wt. % water and an emulsifier with lactic acid bacteria, and after sterilization or pasteurization, homogenizing the sterilized or pasteurized fermented material as such without substantial removal of the whey, and cooling the homogenized material.

DETAILED DESCRIPTION OF THE INVENTION

The cream mix of the present invention may contain 2 to 15 wt. %, preferably 4 to 10 wt. %, of a protein component based on the total weight of the so-called cream mix. When the amount of the protein component falls below 2% then the characteristic flavor and body of the cream cheese is lost. In an extreme case, the emulsion breaks down due to an imbalance between the fat and protein components. On the other hand, it is undesirable for the amount of the protein component to exceed 15%, as then the texture of the product becomes crumbly like cottage cheese.

Examples of the protein component include dairy products (for example, milk, processed milk, fresh cream, skimmed milk, skimmed milk powder, whole milk powder, natural cheese or processed cheese or the like), caseins (for example, acid casein, rennet casein or sodium caseinate or the like), or milk proteins derived from whey protein and the like as well as various other animal and vegetable derived proteins.

The carbohydrate assimilable by lactic acid bacteria may be contained in the mix in an amount of 2 to 15 wt. %, preferably 4 to 8 wt. %. It is undesirable for the amount of the carbohydrate assimilable by lactic acid bacteria to fall below 2% as then there is insufficient development of the flavor from the lactic acid fermentation. On the other hand, if the amount exceeds 15%, there is too much flavor development and an unpleasant taste results. Namely, as the process of the present invention differs from conventional processes in that the cream cheese-like products are made without removing the whey, an excess of this flavor component causes the development of a rancid smell. Examples of the carbohydrate assimilable by lactic acid bacteria include skimmed milk powders, lactose derived from milk products or lactose synthesized from sugars such as glucose or galactose and the like. Glucose and the like may also be used.

The fat component contained in the mix is used in an amount of 10 to 50 wt. %, preferably 15 to 40 wt. %. It is undesirable for the amount to be too small as then it is difficult to provide a product with suitable body, nor is it desirable for there to be too much as this causes the product to have an oily texture when eaten. Examples of the fat component include vegetable fats and oils such as rapeseed oil, soybean oil, sunflower seed oil, cotton seed oil, peanut oil, rice bran oil, corn oil, safflower oil, olive oil, kapok oil, sesame oil, evening primrose oil, palm oil, shea butter, sal fat, cacao butter, coconut oil, palm kernel oil and the like, as well as animal fats and oils such as milk fat, tallow, lard, fish oils, blubber oil and the like. The fats and oils given above can be used alone or in combination, and their processed products such as hydrogenated, fractionated and interesterified products may also be used. Additionally, milk products such as butter and fresh cream may be used as milk fat sources.

Water may be contained in an amount of 40 to 75 wt. %, although if the amount falls below this limit then the resultant emulsion state tends to become unstable and the viscosity of the mix tends to increase which results in deterioration of the workability and spreadability. On the other hand, if there is an excess, the product becomes too soft, which again results in deterioration in the workability and spreadability.

Although the cream mix is prepared using the above components, on preparation, an emulsifier is also used. The emulsifier is not specifically limited and any known emulsifier can be used. Examples include lecithin, lecithin fractionated with an alcohol or the like, lecithin partially hydrolysed with an acid or an alkali or an enzyme, sucrose fatty acid esters, propylene glycol fatty acid esters, sorbitan fatty acid esters, glycerin fatty acid esters, polyglycerol fatty acid esters and various organic acid monoglycerides such as acetic acid monoglyceride, tartaric acid monoglyceride, acetic acid tartaric acid mixed monoglyceride, citric acid monoglyceride, diacetyl tartaric acid monoglyceride, lactic acid monoglyceride, succinic acid monoglyceride, malic acid monoglyceride and the like. One or more of them are added in an amount of 0.05 to 5.0 wt. %, preferably 0.1 to 2.0 wt. % based on the weight of the fat component. In addition to the above emulsifiers, known additives such as calcium salts, phosphates and the like may be used.

The cream mix, which can be prepared according to any conventional method using the above ingredients, is then, normally, subjecting to lactic acid fermentation after homogenization, sterilization or pasteurization and then cooling of a mixture of the ingredients. The fermentation is conducted using a lactic acid bacteria starter at 15 to 45° C. until the fermented mixture attains a pH of 3.5 to 5.7, preferably 4.0 to 5.5. Alternatively, after fermentation an organic acid or alkaline salt can be used to adjust the pH. If the pH is higher than 5.7 then the shelf life of the product tends to deteriorate. On the other hand, if it is lower than 3.5, acidic flavor becomes too strong for it to be used for kneading, filling or spreading purposes as the flavor cannot be neutralized to suit the whole product. Thus, the above pH range is suitable for production. Next, the product is sterilized or pasteurized by heating, preferably in the range of 60 to 95° C. Furthermore, the cream mix may be naturally occurring fresh cream which is appropriately diluted with milk, skimmed milk or the like.

In conventional processes, after sterilization or pasteurization, the whey is removed. However, in the present invention, there is no separation off of the whey, then it is preferable to add a stabilizer. The stabilizer should be added in an amount of 0.01 to 5.0 wt. % as appropriate with respect to the lactic acid fermentation material. Examples of the stabilizer include gums such as locust bean gum, guar gum, xanthan gum, gum arabic, and the like; cellulose derivatives such as finely divided cellulose and carboxymethylcellulose; starch such as corn starch, rice starch, potato starch, tapioca starch, wheat starch and sweet potato starch; and modified starch such as phosphate starch, α-starch and the like. In particular, in the present invention, when starch is used as the stabilizer then cream cheese-like products having properties suitable for a spread can be obtained.

Furthermore, for the purpose of flavouring, flavourings such as butter flavor, milk flavor and cheese flavor; various seasonings, fruit purees or fruit powders may also be used. For the purpose of sweetening, mono and oligosaccharides such as sucrose, glucose, fructose, or maltose; sugar alcohols such as sorbitol, maltitole and lactitole; and sweeteners such as aspartam, stevioside and thaumatin may be used, and colourings such as β-carotene and annatto pigment may also be used.

As the final work-up stage of the above steps, homogenization and cooling are carried out. The homogenization is carried out with the product at a temperature of not lower than 40° C., preferably at 70 to 90° C., and a homogenization pressure of 0 to 200 kg/cm$^2$ is suitable.

The cream cheese-like products thus obtained have a soft paste-like consistency and a good flavor. The hardness of the product is within the range of 10 to 500 g/0.785 cm$^2$, preferably 20 to 300 g/0.785 cm$^2$ (in terms of a value measured with the Rheometer manufactured by Fudo Kogyo, Japan with the product at a temperature of 5° C. using a plunger of 1 cm diameter and a table speed of 5 cm/min). The product having the hardness within this range has the advantages that it can easily be blended in with other confectionery ingredients and has squeezability suitable for use as a filling and spreadability suitable for use as a spread.

The following examples and comparative examples further illustrate the present invention in detail but are not to be construed to limit the scope thereof. All parts and percentages are by weight unless otherwise stated.

EXAMPLE 1

While 18 parts of hydrogenated rapeseed oil (melting point: 31° C.) were warmed to 60° C., 0.05 parts each of lecithin and monoglyceride were added and the mixture was dissolved with stirring to prepare an oil phase. Separately, 57 parts of water were warmed to about 30° C. and 10 parts of skimmed milk powder were gradually added with stirring by a homomixer to prepare an aqueous phase.

15 parts of unsalted butter as well as the above-prepared oil phase were added to the aqueous phase obtained above, then after pre-emulsifying at 70° C. for 30 minutes, the mixture was pasteurized and then homogenized at a pressure of 100 kg/cm$^2$ and then rapidly cooled to 20° C. to obtain a cream mix. The cream mix contained 30% of fat, 3.3% of protein, 60.0% of water and 5.5% of carbohydrate assimilable by lactic acid bacteria.

1 part of lactic acid bacteria (a mixed strain of *Streptococcus cremoris* and *Streptococcus lactis*) was added to the cream mix obtained above, and fermentation was carried out at 20° C. for 15 hours to obtain a liquid fermented product at pH 4.7. After the fermented product had been pasteurized at 80° C. for 30 minutes, 1 part of corn starch, 0.1 part of table salt and 0.05 part of milk flavor were added to 100 parts of the fermented product, and then, after the product had been kneaded for 10 minutes at 80° C., it was homogenized under a pressure of 100 kg/cm$^2$, then the mixture was put into a plastic film tube, sealed and rapidly cooled to 5° C. to obtain the desired cream cheese-like product.

The cream cheese-like product thus obtained, as can be seen from the followings comparative examples, could be easily smeared, blended in easily with powders and had a soft, smooth paste-like consistency, and compared to other cream cheese-like products produced by simple non-fermentation processes, it had a natural rich creamy flavor. Also it excelled in use as a spread for bread, as it did not soak into the bread and when used in a sandwich with ham or cutlets, for example, it showed more binding capability with the filling ingredient than commercially available margarine or mayonnaise, and exhibited reliable spreadability, even with changes in the ambient temperature.

COMPARATIVE EXAMPLE 1

80 parts of water were warmed to about 30° C. and 10 parts of skimmed milk powder were gradually added with stirring to dissolve the powder and prepare an aqueous phase using a homomixer. Then, 10 parts of unsalted butter, 0.05 parts each of lecithin and monoglyceride were added to the aqueous phase and were pre-emulsified at 70° C. for 30 minutes and after pasteurization treatment, the mixture was homogenized with a homogenizer under a pressure of 100 kg/cm$^2$ and then it was rapidly cooled to 20° C. to give a cream mix. The resulting cream mix contained 8.0% of fat, 3.3% of protein, 81.0% of water and 5.5% of carbohydrate assimilable by lactic acid bacteria. Thereafter, according to the same process as in Example 1, the product was worked up to obtained a cream cheese-like product which had little body and a watery flavor due to its low fat content.

COMPARATIVE EXAMPLE 2

While 18 parts of hydrogenated rapeseed oil (melting point: 31° C.) were warmed to 60° C., 0.05 parts each of lecithin and propylene glycol fatty acid ester and a small amount of oil soluble flavouring were gradually added with stirring to give an oil phase. Separately, 62 parts of water were heated to about 30° C. and while being stirred using a homomixer, 3 parts of sodium caseinate and 2 parts of skimmed milk powder were gradually added to give an aqueous phase.

The oil phase and 15 parts of unsalted butter were added to the aqueous phase and after pre-emulsification and pasteurization had been conducted at 70° C. for 30 minutes, the mixture was subjected to homogenization with a homogenizer under a pressure of 100 kg/cm$^2$, after which it was rapidly cooled to 20° C. to give a cream mix. The resulting cream mix contained 30.0% of fat, 3.2% of protein, 65.0% of water and 1.1% of carbohydrate assimilable by lactic acid bacteria. Thereafter, the same process as in Example 1 was followed.

The product thus obtained was a cream cheese-like product which although it had body, had not developed sufficient flavor from the fermentation because the amount of carbohydrates assimilable with lactic acid in the formulation was too small.

COMPARATIVE EXAMPLE 3

According to the same method as Example 1, a cream cheese-like product was obtained except that lactic acid was used in place of lactic acid bacteria and the pH of the cream mix was adjusted to 4.7. In the resulting product, there was little strong flavor, but a sharp, sour taste, because there had been no lactic acid fermentation.

The formulations of the respective examples are as follows:

| Components | Example | Comparative Examples | | |
|---|---|---|---|---|
| (parts) | 1 | 1 | 2 | 3 |
| Cream mix | | | | |
| hydrogenated rapeseed oil | 18 | 0 | 18 | 18 |
| unsalted butter | 15 | 10 | 15 | 15 |

-continued

| Components | Example | Comparative Examples | | |
|---|---|---|---|---|
| (parts) | 1 | 1 | 2 | 3 |
| skimmed milk powder | 10 | 10 | 2 | 10 |
| sodium caseinate | 0 | 0 | 3 | 0 |
| water | 57 | 80 | 62 | 57 |
| emulsifier | 0.1 | 0.1 | 0.1 | 0.1 |
| bulk starter | 1 | 1 | 1 | 0 |
| lactic acid | 0 | 0 | 0 | as appropriate |
| After pasteurization | | | | |
| fermented cream mix | 100 | 100 | 100 | 100 |
| corn starch | 1 | 1 | 0 | 1 |
| table salt | 0.1 | 0.1 | 0.1 | 0.1 |
| milk flavouring | 0.05 | 0.05 | 0.05 | 0.05 |

Using the cream cheese-like products obtained in Example 1, Comparative Examples 1, 2 and 3 and a Danish natural cream cheese, a souffle cheese cake was prepared using the following formulation.

| Formulation (g) | |
|---|---|
| cheese/cheese-like product | 200 |
| milk | 300 |
| wheat flour (low gluten) | 75 |
| sugar | 25 |
| egg yolk | 130 |
| butter | 80 |
| egg white | 300 |
| sugar | 140 |
| lemon juice | 3 |

Method

The egg yolk, sugar and flour were placed in a bowl and beaten with a whisk until creamy. Next, the cream cheese-like product or cream cheese was placed in a pan with the milk and gently brought to the boil and then the above batter was immediately added and the resulting custard quickly beaten with a whisk until creamy. Separately, the sugar and egg white were placed in a bowl and beaten with a whisk until a specific gravity of 0.22 g/cm$^3$ was obtained and then the lemon juice was added. The meringue was added to the custard obtained above and they were blended together (final specific gravity of 0.47 g/cm$^3$). 400 g of the final cake mixture were poured into a 18 cm diameter cake tin, the sides of which had been greased with shortening, and was baked for 40 minutes at 180° C.

The evaluation of the cakes is as follows.

| | Example | Comparative Examples | | | Danish |
|---|---|---|---|---|---|
| | 1 | 1 | 2 | 3 | Cheese |
| Texture | good | watery | coarse | good | good |
| Flavor | good | poor | bad | bad | good |
| Shape retention | good | fair | good | good | good |
| Hardness* | 120 | 5 | 40 | 40 | 1200 |

*the hardness of the cheese or cheese products was measured using a Rheometer manufactured by Fudo Kogyo, Japan with the product at a temperature of 5° C. and using a plunger with a diameter of 1 cm and a table speed of 5 cm/min: units; g/0.785 cm$^2$ The souffle cheese cake baked using the cream cheese-like product of Example 1 showed excellent properties and flavor when compared with the cakes prepared using the cream cheese-like products obtained from Comparative Examples 1, 2 and 3 and compared favourably with that made using the natural cream cheese. In fact, the natural cream cheese was hard and extremely difficult to blend in with the other powder ingredients.

In the following, the spreadability on bread of the product obtained in Example 1 is compared with commercially available margarine and mayonnaise.

Method

Commercially available bread was cut into 1 cm thick slices and 2 g of each sample was spread onto each of 2 slices of bread and a cutlet sandwiched between them and the condition of the sandwich was observed after it had been left to stand overnight at room temperature.

|  | Example 1 | Margarine | Mayonnaise |
| --- | --- | --- | --- |
| Flavor | good | good | good |
| Consistency | good | good | good |
| Spreadability | good | fairly poor | good |
| Soaking into bread | little | fairly large | little |
| Binding with filling ingredient | good | poor | poor |

Change in hardness with respect to changes in temperature (as measured with a Rheometer*)

|  | 5° C. | 10° C. | 20° C. | 30° C. | 40° C. |
| --- | --- | --- | --- | --- | --- |
| Commercially available margarine | 280 | 190 | 70 | 3 | liquid |
| Commercially available mayonnaise | 10 | 10 | 11 | 9 | 9 |
| Example 1 | 23 | 23 | 29 | 11 | 9 |

*Rheometer measurement: test conditions; plunger of 1 cm diameter, table speed of 5 cm/min, equipment from Fudo Kogyo, Japan: units; g/0.785 cm$^2$ As can be seen clearly from above, margarine melted at temperatures above 30° C. and became unspreadable, while Example 1 of the present invention showed relatively reliable spreadability from 5 to 40° C. It also showed little soaking into the bread when compared with margarine and mayonnaise. Additionally, when used in a sandwich, the spread of the present example showed good binding capability with the filling ham or cutlet.

EXAMPLE 2

While 18 parts of hydrogenated rapeseed oil (melting point 31 ° C.) was heated up to 60° C., 0.05 parts each of lecithin and monoglyceride and a small amount of oil soluble flavouring were added with stirring to prepare an oil phase solution. Separately, 52 parts of water were heated up to approximately 30° C. and, while being stirred with a homomixer, 15 parts of skimmed milk powder were gradually added to prepare an aqueous phase.

The above oil phase was added to the above aqueous phase with 15 parts of unsalted butter and heated to 70° C. and then pre-emulsified and pasteurized for 30 minutes. The liquid mixture was homogenized with a homogenizer under a pressure of 100 kg/cm$^2$ and then rapidly cooled to 20° C. to give a cream mix. The cream mix contained 30.1 of % fat, 5.3% of protein, 54.5 % of water and 8.3 % of carbohydrate assimilable by lactic acid bacteria.

1 part of lactic acid bacteria (a mixed strain of *Streptococcus cremoris* and *Streptcoccus lactis*) was added to 100 parts of the cream mix obtained above, and fermentation was carried out at 20° C. for 15 hours to obtain a liquid fermented product at pH 4.7. After the fermented product had been pasteurized at 80° C. for 30 minutes, 0.3 part of locust bean gum and 0.4 part of table salt and a small amount of flavouring were added to 100 parts of the fermentation liquid, and after being kneaded together for 10 minutes at 80° C. the mixture was homogenized under a pressure of 100 kg/cm$^2$, and then packed into a plastic film tube, sealed and rapidly cooled to 5 ° C. to give a cream cheese-like product.

The product could easily be squeezed or smeared and showed a soft, smooth paste-like consistency suitable for the easy blending in with powders, and, compared with other cream cheese-like products prepared by similar simple non-fermentation processes, it had a rich, creamy flavor.

EXAMPLE 3

This was conducted in the same manner as Example 2 except that no locust bean gum was added.

This product had almost the same favourable properties as the product of Example 2 except that it was not quite as smooth.

As described hereinabove, according to the present invention, it is possible to produce cream cheese-like products with a long shelf life which have a good flavor, and a soft, paste-like consistency, which have excellent workability for use in cake manufacture, show little change in hardness at ambient temperatures when used as a spread for bread and show good binding with filling ingredients without soaking into the bread.

What is claimed is:

1. A process for the production of cream cheese-like products which comprises fermenting a cream mix comprising 2 to 15 wt. % of a protein component, 2 to 15 wt. % of a carbohydrate assimilable by lactic acid bacteria, 10 to 50 wt. % of a fat component, 40 to 75 wt. % of water and an emulsifier, with lactic acid bacteria; pasteurizing or sterilizing the fermented mixture; homogenizing the pasteurized or sterilized material; and cooling the homogenized material; said process being conducted without removing whey.

2. The process according to claim 1, wherein a stabilizer is also added to the mix.

3. The process according to claim 1, wherein the cream cheese-like product has a hardness in the range of 10 to 500 g/0.785 cm$^2$ as measured with the product at a temperature of 5° C. and using a plunger with a diameter of 1 cm and a table speed of 5 cm/min.

4. The process according to claim 2, wherein the cream cheese-like product has a hardness in the range of 10 to 500 g/0.785 cm$^2$ as measured with the product at a temperature of 5° C. and using a plunger with a diameter of 1 cm and a table speed of 5 cm/min.

* * * * *